United States Patent
Sakamoto et al.

(10) Patent No.: US 10,877,140 B2
(45) Date of Patent: Dec. 29, 2020

(54) RADAR DEVICE AND METHOD OF DETECTING OBJECT USING RADAR DEVICE

(71) Applicant: DENSO CORPORATION, Kariya (JP)

(72) Inventors: Mai Sakamoto, Kariya (JP); Koichiro Suzuki, Tokyo (JP)

(73) Assignee: DENSO CORPORATION, Kariya (JP)

(*) Notice: Subject to any disclaimer, the term of this patent is extended or adjusted under 35 U.S.C. 154(b) by 95 days.

(21) Appl. No.: 16/307,601

(22) PCT Filed: Jun. 7, 2017

(86) PCT No.: PCT/JP2017/021206
§ 371 (c)(1),
(2) Date: Dec. 6, 2018

(87) PCT Pub. No.: WO2017/213199
PCT Pub. Date: Dec. 14, 2017

(65) Prior Publication Data
US 2019/0242987 A1    Aug. 8, 2019

(30) Foreign Application Priority Data
Jun. 9, 2016  (JP) .................................. 2016-115264

(51) Int. Cl.
*G01S 13/34* (2006.01)
*G01S 13/60* (2006.01)
(Continued)

(52) U.S. Cl.
CPC ................ *G01S 13/34* (2013.01); *G01S 7/32* (2013.01); *G01S 7/354* (2013.01); *G01S 13/60* (2013.01);
(Continued)

(58) Field of Classification Search
CPC .......... G01S 13/34; G01S 13/60; G01S 13/87; G01S 13/93; G01S 13/931; G01S 7/32;
(Continued)

(56) References Cited

U.S. PATENT DOCUMENTS 9,647,648 B2* 5/2017 Iwai ........................ G01S 13/02
9,784,828 B2* 10/2017 Patole ................... G01S 13/584
(Continued)

FOREIGN PATENT DOCUMENTS

JP  2000-292530 A  10/2000
JP  2008-145425 A   6/2008
(Continued)

*Primary Examiner* — Timothy X Pham
(74) *Attorney, Agent, or Firm* — Maschoff Brennan

(57) ABSTRACT

A radar device calculates positions and relative velocities of points of reflection from an FMCW beat signal, extracts stationary reflection points each being a point of reflection having a relative velocity of zero, and sets, for each of the stationary reflection points, an object area estimated to contain an object including the stationary reflection point. The radar device calculates positions and relative velocities of points of reflection from a 2CW beat signal from which a DC component has been removed, extracts in-area reflection points each being a point of reflection that belongs to the object area. The radar device then computes, for each of the in-area reflection points, a cross velocity that is a velocity of the in-area reflection point in a cross-range direction, and statistically processes calculated cross velocities for each of the object areas. The radar device calculates an estimated value of a cross velocity of an object.

6 Claims, 4 Drawing Sheets

(51) Int. Cl.
*G01S 13/87* (2006.01)
*G01S 7/32* (2006.01)
*G01S 13/93* (2020.01)
*G01S 7/35* (2006.01)
*G01S 13/931* (2020.01)

(52) U.S. Cl.
CPC .............. *G01S 13/87* (2013.01); *G01S 13/93* (2013.01); *G01S 13/931* (2013.01); *G01S 2013/93272* (2020.01)

(58) Field of Classification Search
CPC ........... G01S 7/354; G01S 2013/93272; G01S 2013/9378
See application file for complete search history.

(56) References Cited

U.S. PATENT DOCUMENTS

2015/0309169 A1  10/2015  Itoh et al.
2017/0146646 A1*  5/2017  Nakabayashi ............ G01S 7/35

FOREIGN PATENT DOCUMENTS

| | | |
|---|---|---|
| JP | 2008-249399 A | 10/2008 |
| JP | 2013-134591 A | 7/2013 |
| JP | 2014-112348 A | 6/2014 |
| JP | 2014-119798 A | 6/2014 |
| JP | 2015-210156 A | 11/2015 |

\* cited by examiner

TRAVELING DIRECTION

RANGE DIRECTION

CROSS-RANGE DIRECTION

RADAR DEVICE AND METHOD OF DETECTING OBJECT USING RADAR DEVICE

This application is a national stage application of PCT Application No. PCT/JP2017/021206, filed on Jun. 7, 2017, which claims priority to Japanese Patent Application No. 2016-115264, filed on Jun. 9, 2016, the disclosure of which is incorporated herein by reference.

TECHNICAL FIELD

The present disclosure relates to a radar device that combines different schemes for measurement.

BACKGROUND ART

A scheme with high distance resolution is used for short-distance measurement. A scheme with low processing loads is used for long-distance measurement. Some radar devices are known to combine such different schemes for measurement. For example, PTL 1 has proposed the following measurement method: Wideband radar (e.g., UWB scheme) is used for short-distance measurement, and narrowband radar (e.g., FMCW scheme) is used for long-distance measurement. Note that UWB stands for ultra-wide band, and FMCW stands for frequency-modulated continuous wave.

CITATION LIST

Patent Literature

[PTL 1]: JP 2008-249399 A

SUMMARY OF THE INVENTION

Problem to be Solved by the Invention

However, the conventional UWB-based technique (technique described in PTL 1) is likely to interfere with other wireless systems. The conventional UWB-based technique also requires hardware that supports high-speed operation for transmitting and receiving pulses of extremely short duration.

Instead of the UWB scheme, a multi-frequency CW scheme may be used for short-distance measurement. In the multi-frequency CW scheme, however, in a case where there is a point of reflection of waves reflected toward the incident direction (hereinafter referred to as the "stationary reflection point"), the signal intensity of reflected waves from the stationary reflection point is very high. As a result, reflected waves from other points of reflection located near the stationary reflection point (hereinafter referred to as "nearby reflection points") are buried. Therefore, information on nearby reflection points cannot be utilized as a result of measurement. In addition, the relative velocity detected at the stationary reflection point is zero. Therefore, the movement of the object having the stationary reflection point cannot be detected accurately.

The present disclosure provides a technique of accurately detecting the movement of an object located within a short distance without using wideband radar.

Solution to Problem

A radar device according to an aspect of the technique of the present disclosure includes a first measurement unit (4: S120), a first extraction unit (4: S130), an area setting unit (4: S150), a removing unit (4: S170), a second measurement unit (4: S190), a second extraction unit (4: S190), a computation unit (4: S200), and an estimation unit (4: S210). The first measurement unit calculates, from a beat signal obtained by transmitting and receiving frequency-modulated continuous waves (hereinafter referred to as "FMCW"), positions and relative velocities of points of reflection of FMCW. The first extraction unit extracts stationary reflection points from a result of measurement obtained by the first measurement unit, the stationary reflection points each being a point of reflection having a relative velocity of zero. The area setting unit sets, for each of the stationary reflection points extracted by the first extraction unit, an object area estimated to contain an object including the stationary reflection point. The removing unit removes a DC component from a beat signal obtained by transmitting and receiving multi-frequency continuous waves (hereinafter referred to as "multi-frequency CW"). The second measurement unit calculates, from the beat signal from which the DC component has been removed by the removing unit, positions and relative velocities of points of reflection of the multi-frequency CW. The second extraction unit extracts in-area reflection points from a result of measurement obtained by the second measurement unit, the in-area reflection points each being a point of reflection included in the object area set by the area setting unit. The computation unit computes, for each of the in-area reflection points extracted by the second extraction unit, a cross velocity that is a velocity of the in-area reflection point in a cross-range direction. The estimation unit statistically processes cross velocities computed by the computation unit for each of the object areas. Consequently, the estimation unit calculates an estimated value of a cross velocity of an object located in the object area.

According to such a configuration, the radar device of the present disclosure can accurately detect the movement, in the range direction and the cross-range direction, of an object located within a short distance on the basis of the results of FMCW-based and multi-frequency CW-based measurements. In short, the radar device of the present disclosure can accurately detect the movement of an object located within a short distance without using wideband radar.

Note that reference signs in parentheses described in this section and in the claims indicate example correspondence relations with components described in the embodiment discussed later as an aspect of the present disclosure. Therefore, these reference signs do not limit the technical scope of the present disclosure.

DESCRIPTION OF EMBODIMENTS

Hereinafter, an embodiment of the present disclosure will be described with reference to the drawings.

1. Configuration

Figure 3:
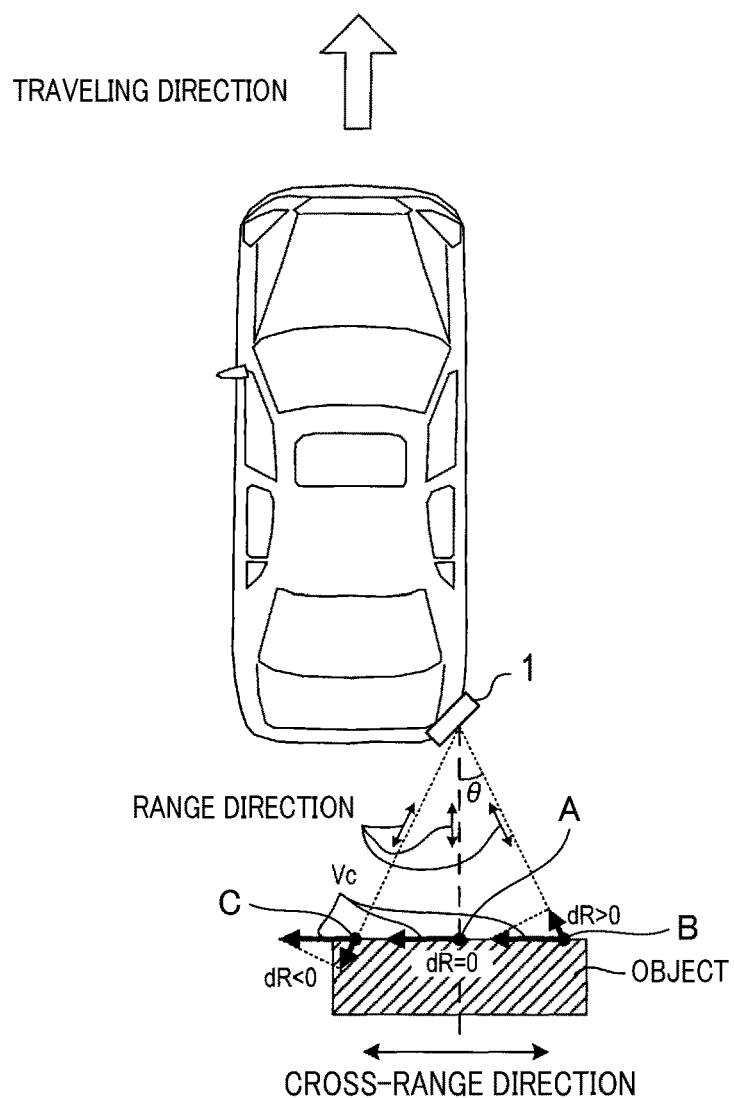
FIG. 3 is an explanatory diagram about a stationary reflection point and nearby reflection points.

Radar devices 1 are installed at the two width-directional ends of a bumper provided at each of the front and rear ends of a vehicle. Each of the two radar devices 1 on the front bumper is arranged in a direction that allows the area in front of and on the right or left side of the vehicle to be included in the probe range. Each of the two radar devices 1 on the rear bumper is arranged in a direction that allows the area behind and on the right or left side of the vehicle to be included in the probe range. These four radar devices 1 have similar configurations. For example, FIG. 3 illustrates an example of the radar device 1 installed at the right rear end of the vehicle.

Figure 1:
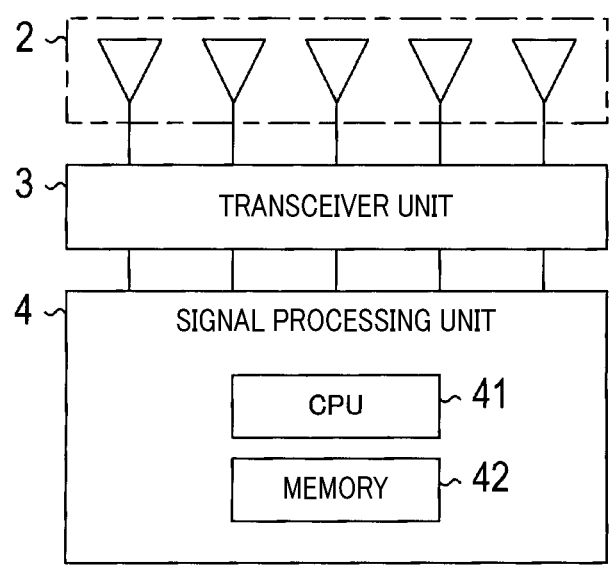
FIG. 1 is a block diagram illustrating a configuration of a radar device.

As illustrated in FIG. 1, the radar device 1 includes an antenna unit 2, a transceiver unit 3, and a signal processing unit 4. The radar device 1 is connected to other in-vehicle devices in a communicable manner over an in-vehicle local area network (not illustrated), for example.

The antenna unit 2 includes, for example, a plurality of antennas aligned in the horizontal direction. The antenna unit 2 transmits and receives millimeter-waveband electromagnetic waves as radar waves.

The transceiver unit 3 alternately transmits and receives radar waves via the antenna unit 2 at predetermined time intervals. At this time, the transceiver unit 3 transmits and receives frequency-modulated continuous waves (FMCW) or two-frequency continuous waves (hereinafter referred to as "2CW") as radar waves. In other words, the transceiver unit 3 uses narrowband radar with bandwidths of hundreds of megahertz or less, not wideband radar such as UWB. The transceiver unit 3 further generates a beat signal for each reception signal received by the plurality of antennas provided in the antenna unit 2. Note that a beat signal as used herein includes the frequency component of the difference between a reception signal and a transmission signal. The transceiver unit 3 performs A/D conversion of a beat signal into reception data, and outputs the reception data to the signal processing unit 4.

The signal processing unit 4 mainly includes a well-known microcomputer having a semiconductor memory (hereinafter referred to as the "memory 42") and a CPU 41. Examples of the memory 42 include a RAM, a ROM, and a flash memory. The CPU 41 reads and executes a program stored in a non-transitory tangible computer-readable storage medium, whereby various functions of the signal processing unit 4 are implemented. In the present embodiment, the memory 42 corresponds to a non-transitory tangible computer-readable storage medium with a program stored therein. In the present embodiment, once a program is executed, the process for implementing various functions (method corresponding to the program) is executed. Note that one or more microcomputers may constitute the signal processing unit 4.

The CPU 41 of the signal processing unit 4 executes a program. Consequently, the signal processing unit 4 at least executes a short-distance detection process for detecting an object located within a short distance on the basis of beat signals obtained from the transceiver unit 3. Note that the way to implement the short-distance detection function of the signal processing unit 4 is not limited to software such as a program. For example, some or all of the elements of the short-distance detection function may be implemented using one or more hardware components. For example, in a case where the short-distance detection function is implemented by hardware such as electronic circuits, digital circuits including a plurality of logic circuits or analog circuits may be used. Alternatively, these circuits may be combined to implement the short-distance detection function.

2. Process

Figure 2:
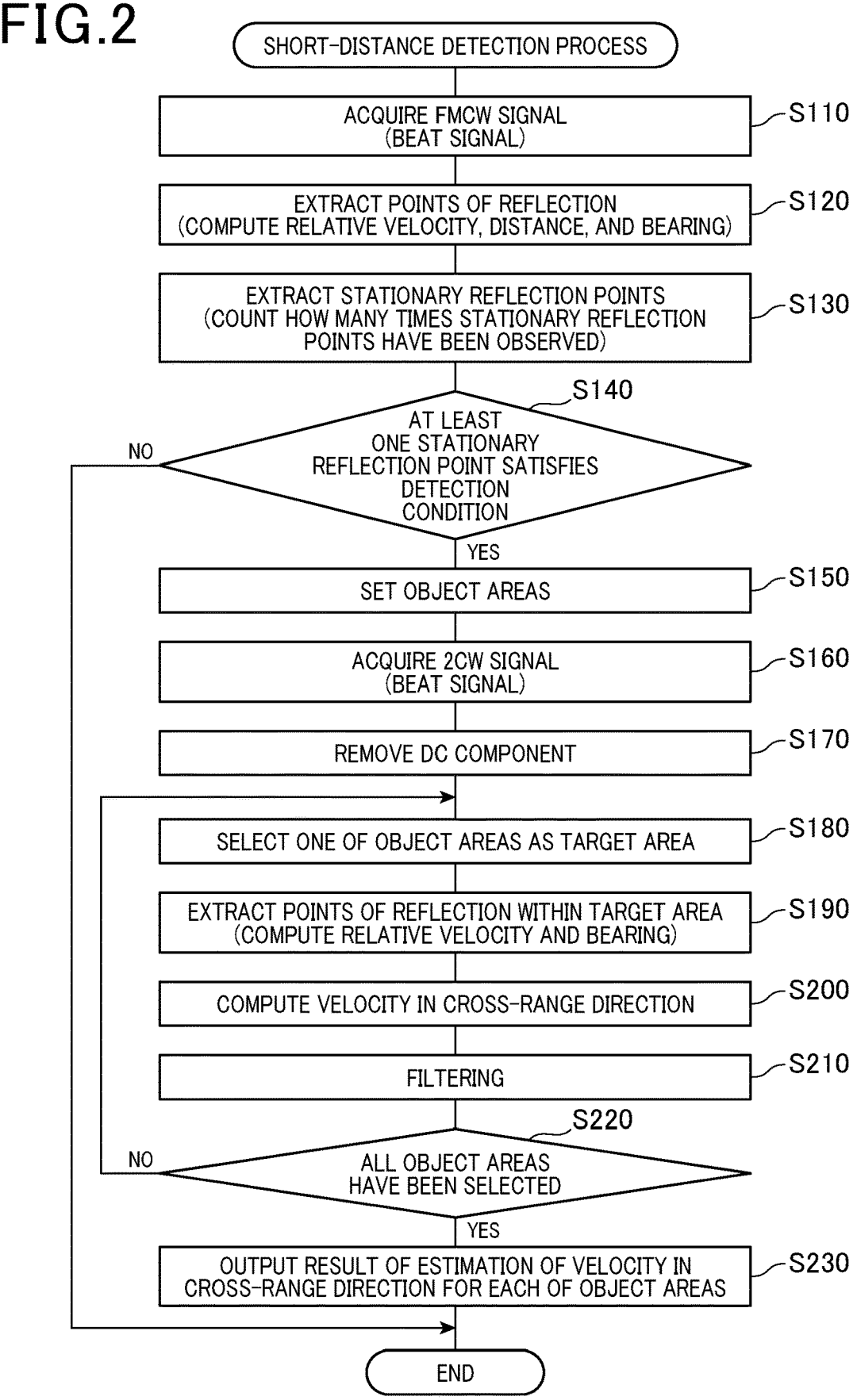
FIG. 2 is a flowchart for a short-distance detection process.

Next, the short-distance detection process that is executed by the signal processing unit 4 will be described using the flowchart in FIG. 2. Note that this process is repeatedly initiated and executed in a predetermined measurement cycle (e.g., 80 ms).

Once this process is initiated, the signal processing unit 4 acquires, from the transceiver unit 3, a beat signal generated by transmitting and receiving FMCW (S110).

The signal processing unit 4 performs a frequency analysis of the beat signal acquired in step S110 to extract points of reflection of FMCW (S120). Note that any known method for FMCW radar may be used for the extraction of points of reflection. At this time, the signal processing unit 4 obtains the following information on points of reflection. Specifically, the signal processing unit 4 calculates the relative velocity Vr, distance R, and bearing $\varphi$ of a point of reflection with respect to the vehicle (hereinafter referred to as the "host vehicle") equipped with the radar device 1. Note that the relative velocity Vr as used herein is the relative velocity in a range direction, i.e., the direction along the straight line connecting the host vehicle and a point of reflection. Hereinafter, the relative velocity in the range direction is referred to as the range velocity dR. FIG. 3 illustrates the range velocities dR of the respective points of reflection on the same object moving in the width direction of the host vehicle. As illustrated in the figure, the range velocities dR vary in accordance with the positional relation between the radar device 1 and the points of reflection even though the points of reflection belong to the same object moving in the width direction of the host vehicle. Specifically, the range velocity dR is zero (dR=0) at position A where the straight line indicating the range direction is orthogonal to the reflection surface. The range velocity dR has a positive value (dR>0) at any point between position B and position A. The range velocity dR has a negative value (dR<0) at any point between position C and position A.

The signal processing unit 4 extracts, as a stationary reflection point from among the points of reflection extracted in step S120, the point of reflection having a range velocity dR of zero (S130). Note that a counter is prepared for counting the number of stationary reflection points continuously measured. The count value of the counter is set in the following manner. For example, suppose the stationary reflection points measured in the previous measurement cycle and the current measurement cycle are at the same position (in the same direction and within the same distance). In this case, the count value for the stationary reflection point measured in the previous measurement cycle is incremented (+1). In contrast, suppose the stationary reflection points measured in the previous measurement cycle and the current measurement cycle are not at the same position. In this case, the count value for the stationary reflection point measured in the previous measurement cycle is set to the initial value (1).

The signal processing unit 4 determines whether any of the extracted stationary reflection points satisfies a preset detection condition (S140). The present embodiment in particular uses the following detection condition: the distance from the host vehicle to a point of reflection is equal to or less than a predetermined distance (upper limit distance), and the count value indicating how many times the point of reflection has been measured is equal to or greater than a predetermined value N (for example, N=4). As a result, if the signal processing unit 4 determines that none of the stationary reflection points satisfies the detection condition (S140: NO), this process is temporarily finished. In contrast, if the signal processing unit 4 determines that at least one of the stationary reflection points satisfies the detection condition (S140: YES), step S150 is executed.

The signal processing unit 4 sets an object area for each of the stationary reflection points that have satisfied the detection condition in step S140 (S150). An object area including a stationary reflection point is set in consideration of the length of a typical vehicle. Note that an object area is a range of bearing angles estimated to contain an object having a stationary reflection point.

The signal processing unit 4 acquires, from the transceiver unit 3, a beat signal obtained by transmitting and receiving 2CW (S160). The beat signal acquired in this step is a signal obtained at the timing regarded as the same as the timing of acquiring the FMCW beat signal in step S110.

Figure 4:
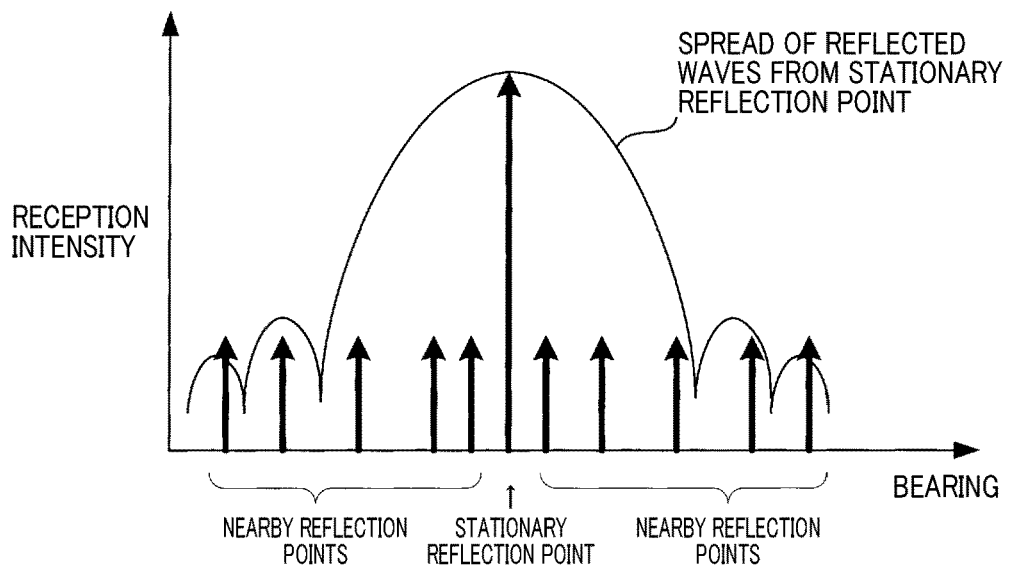
FIG. 4 is a diagram illustrating the influence of a stationary reflection point on nearby reflection points in a 2CW-based beat signal.

The signal processing unit 4 removes a DC component from the beat signal acquired in step S160 (S170). Specifically, the signal processing unit 4 removes the signal component that makes the stationary reflection point detected in step S130 affect the result of measurement of nearby reflection points. The signal intensity of reflected waves from the stationary reflection point is very high. Therefore, signal components that are based on reflected waves from nearby reflection points located near the stationary reflection point are buried in the signal component that is based on reflected waves from the stationary reflection point. In this regard, the signal processing unit 4 removes the signal component that causes signal components that are based on reflected waves from nearby reflection points to be buried in the signal component that is based on reflected waves from the stationary reflection point. Consequently, as illustrated in FIG. 4, the radar device 1 according to the present embodiment can extract signal components that are based on reflected waves from nearby reflection points located near the stationary reflection point.

The signal processing unit 4 selects one of the object areas set in step S150 as a target area (S180).

The signal processing unit 4 performs a frequency analysis of the beat signal from which the DC component has been removed in step S170 to extract points of reflection of 2CW. Consequently, the signal processing unit 4 extracts in-area reflection points, i.e., points of reflection located within the target area selected in step S180 (S190). Note that any known method for 2CW radar may be used for the extraction of points of reflection. At this time, the signal processing unit 4 obtains the following information on in-area reflection points. Specifically, the signal processing unit 4 calculates the range velocity dR (relative velocity in the range direction) and bearing θ of a point of reflection with respect to the host vehicle. Note that the bearing θ as used herein is the angle made with the bearing to the detected stationary reflection point in the selected target area (refer to FIG. 3).

The signal processing unit 4 computes the velocity Vc (hereinafter referred to as the "cross velocity Vc") of an in-area reflection point in a cross-range direction on the basis of the result of computation in step S190. The cross-range direction as used herein is the direction orthogonal to the straight line indicating the range direction of the stationary reflection point in the target area (refer to FIG. 3). The cross-range direction is the direction along the surface of reflection of FMCW or 2CW, The signal processing unit 4 computes the cross velocity Yc of each of the in-area reflection points using Formula (1) on the basis of the range velocity dR and the bearing θ.

$$Vc=dR/\cos \theta \quad (1)$$

Figure 5:
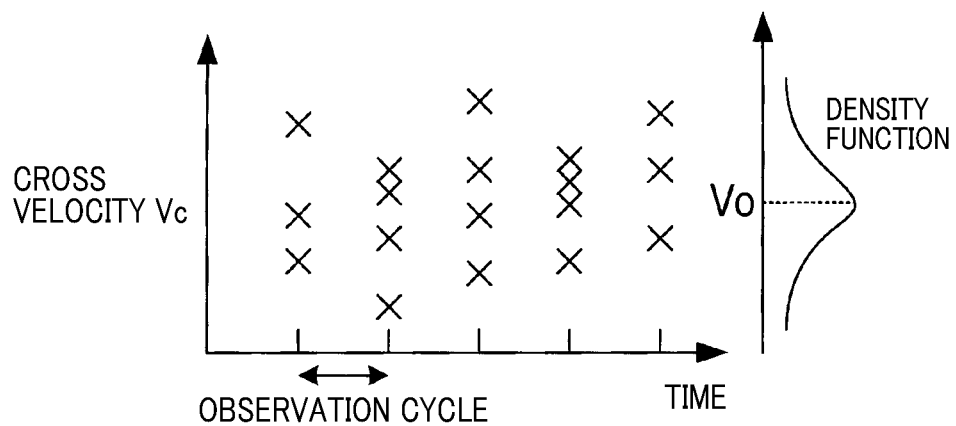
FIG. 5 is a diagram illustrating an example of filtering.

The signal processing unit 4 filters the cross velocities Vc of the respective in-area reflection points calculated in step S200. Consequently, the signal processing unit 4 estimates the cross velocity Vo (hereinafter referred to as the "estimated cross velocity Vo") (S210). Specifically, the signal processing unit 4 computes the average or median of the cross velocities Vc of all the in-area reflection points by filtering (in other words, statistically processes the cross velocities Vc of all the in-area reflection points). The signal processing unit 4 sets the result of computation as the estimated cross velocity Vo. Note that the method of computing the estimated cross velocity Vo is not limited to this method. For example, as illustrated in FIG. 5, the signal processing unit 4 calculates the probability density function of the distribution of the cross velocities Vc using a kernel function. The signal processing unit 4 then sets the mode of the probability density function as the estimated cross velocity Vo.

The signal processing unit 4 determines whether all the object areas set in step S150 have been selected as target areas (S220). As a result, if the signal processing unit 4 determines that not all the object areas have been selected as target areas (S220: NO), the process returns to step S180. Then, steps S180 to S210 are repeated. In other words, the signal processing unit 4 calculates the estimated cross velocity Vo for each of the object areas. In contrast, if the signal processing unit 4 determines that all the object areas have been selected as target areas (S220: YES), step S230 is executed.

The signal processing unit 4 outputs the estimated cross velocity Vo calculated for each of the object areas as the estimated velocity, in the cross-range direction, of the object located within the object area (S230). Then, this process is finished.

3. Effects

According to the first embodiment described in detail above, the following effects can be obtained.

(3a) The radar device 1 processes a beat signal obtained using the FMCW scheme. Consequently, the existence direction of the stationary reflection point is specified. The radar device 1 also removes a DC component from a beat signal obtained using the 2CW scheme with respect to the specified direction. Specifically, the radar device 1 removes the signal component that is based on reflected waves from the stationary reflection point. Consequently, nearby reflection points (a plurality of points of reflection) located near the stationary reflection point are extracted. The range velocity dR of a nearby reflection point is not zero. Therefore, the cross velocity Vc can be calculated on the basis of the range velocity dR. In this manner, the radar device 1 can accurately detect the movement, in the cross-range direction, of an object located within a short distance without using wideband radar.

(3b) The radar device 1 statistically processes the cross velocities Vc calculated from a plurality of nearby reflection points. Consequently the cross velocity Vc of the object having the nearby reflection points is estimated. In this manner, the radar device 1 can perform the short-distance detection process for an object by utilizing signal components (signal components with low signal intensity) that are based on reflected waves from nearby reflection points. The radar device 1 can also prevent false detection of the movement of an object even when performing the detection process using signal components with low signal intensity.

Figure 6:
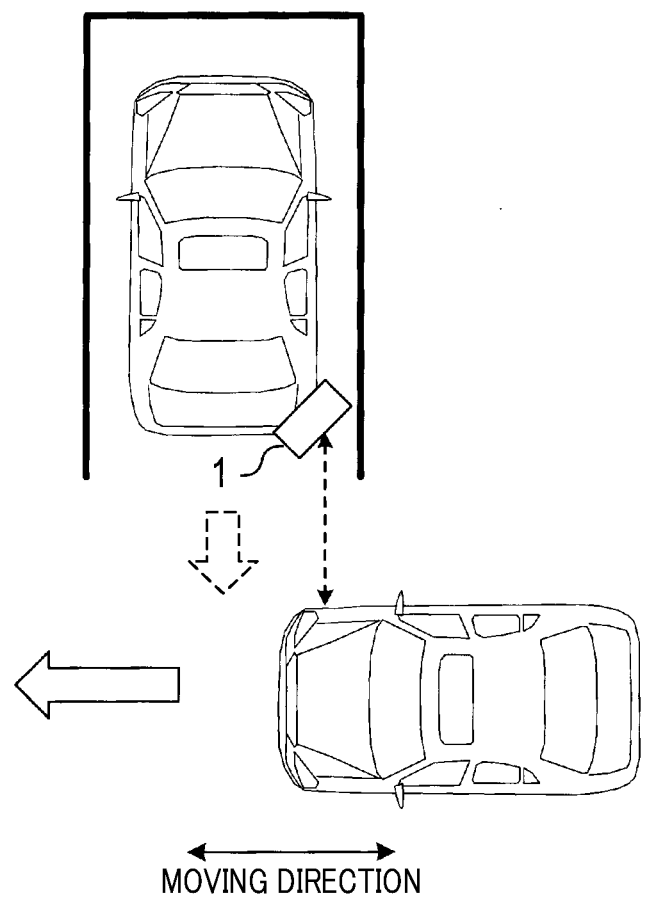
FIG. 6 is a diagram illustrating a situation where the short-distance detection process is used.

(3c) For example, the radar device 1 can accurately detect the movement of the vehicle in the situation illustrated in FIG. 6. FIG. 6 illustrates a situation where the host vehicle is about to move back and leave the parking space in a parking lot. Meanwhile, in this situation, the other vehicle is about to cut across behind the host vehicle. The radar device 1 can accurately detect the velocity of the other vehicle in its moving direction in such a situation.

4. Other Embodiments

Although an embodiment of the present disclosure has been described so far, the technique of the present disclosure is not limited to the above embodiment, but can be variously changed for implementation.

(4a) According to the technique of the present disclosure, a plurality of functions of a single component in the above embodiment may be implemented by a plurality of components. A single function of a single component may be implemented by a plurality of components. A plurality of functions of a plurality of components may be implemented by a single component. A single function that is implemented by a plurality of components may be implemented by a single component. Part of the configuration of the above embodiment may be omitted. At least part of one configuration of the above embodiment may be added to or replaced by another configuration of the above embodiment. Note that embodiments of the present disclosure include every aspect included in the technical idea specified by the terms described in the claims.

(4b) In addition to the above-mentioned radar device 1, the technique of the present disclosure can be provided in various forms including the following examples. Specifically, the technique of the present disclosure can be provided by a system including the radar device 1 as a component. The technique of the present disclosure can also be provided by a program for causing a computer to function as the radar device 1. The technique of the present disclosure can also be provided by a non-transitory tangible computer-readable storage medium with the program recorded therein, such as a semiconductor memory. The technique of the present disclosure can also be provided by a method of detecting the velocity of movement in the cross-range direction.

REFERENCE SIGNS LIST

1 . . . Radar device (in-vehicle radar device
2 . . . Antenna unit
3 . . . Transceiver unit
4 . . . Signal processing unit
41 . . . CPU
42 . . . Memory

The invention claimed is:

1. A radar device comprising:
a first measurement unit configured to calculate, using a processor, from a beat signal obtained by transmitting and receiving frequency-modulated continuous waves, positions and relative velocities of points of reflection of the frequency-modulated continuous waves;
a first extraction unit configured to extract, using the processor, stationary reflection points from a first result of measurement obtained by the first measurement unit, the stationary reflection points each being a point of reflection having a relative velocity of zero;
an area setting unit configured to set, using the processor, for each of the stationary reflection points extracted by the first extraction unit, an object area estimated to contain an object including a stationary reflection point;
a removing unit configured to remove, using the processor, a direct current component from a beat signal obtained by transmitting and receiving multi-frequency continuous waves, the direct current component being a signal component that is an average amplitude of a waveform of the beat signal;
a second measurement unit configured to calculate, using the processor, from the beat signal from which the direct current component has been removed by the removing unit, positions and relative velocities of points of reflection of the multi-frequency continuous waves;
a second extraction unit configured to extract, using the processor, in-area reflection points from a second result of measurement obtained by the second measurement unit, the in-area reflection points each being a point of reflection included in the object area set by the area setting unit;
a computation unit configured to compute, using the processor, for each of the in-area reflection points extracted by the second extraction unit, a cross velocity that is a velocity of an in-area reflection point in a cross-range direction; and
an estimation unit configured to statistically process, using the processor, cross velocities computed by the computation unit for each of the object areas to calculate an estimated value of a cross velocity of an object located in the object area.

2. The radar device according to claim 1, wherein the area setting unit sets the object area for each of the stationary reflection points extracted by the first extraction unit and continuously measured at a position for a preset number of times or more.

3. The radar device according to claim 1, wherein the area setting unit sets the object area for each of the stationary reflection points extracted by the first extraction unit and located within a preset upper limit distance.

4. The radar device according to claim 1, wherein the estimation unit calculates a probability density function using a kernel function, and sets a mode of the probability density function as the estimated value.

5. A method executable by a signal processor for detecting an object using a radar device equipped with the signal processor, the method comprising:
a first measurement step of calculating, using the signal processor, from a beat signal obtained by transmitting and receiving frequency-modulated continuous waves, positions and relative velocities of points of reflection of the frequency-modulated continuous waves;
a first extraction step of extracting, using the signal processor, stationary reflection points from a first result of measurement obtained in the first measurement step, the stationary reflection points each being a point of reflection having a relative velocity of zero;
an area setting step of setting, using the signal processor, for each of the stationary reflection points extracted in the first extraction step, an object area estimated to contain an object including a stationary reflection point;

a removing step of removing, using the signal processor, a direct current component from a beat signal obtained by transmitting and receiving multi-frequency continuous waves, the direct current component being a signal component that is an average amplitude of a waveform of the beat signal;

a second measurement step of calculating, using the signal processor, from the beat signal from which the direct current component has been removed in the removing step, positions and relative velocities of points of reflection of the multi-frequency continuous waves;

a second extraction step of extracting, using the signal processor, in-area reflection points from a second result of measurement obtained in the second measurement step, the in-area reflection points each being a point of reflection included in the object area set in the area setting step;

a computation step of computing, using the signal processor, for each of the in-area reflection points extracted in the second extraction step, a cross velocity that is a velocity of an in-area reflection point in a cross-range direction; and an estimation step of statistically processing, using the signal processor, cross velocities computed in the computation step for each of the object areas to calculate an estimated value of a cross velocity of an object located in the object area.

6. A radar device comprising:

a non-transitory memory;

a processor in communication with the non-transitory memory, the processor being configured to:

perform first measurement processing that calculates, from a beat signal obtained by transmitting and receiving frequency-modulated continuous waves, positions and relative velocities of points of reflection of the frequency-modulated continuous waves;

perform first extraction processing that extracts stationary reflection points from a first result of measurement obtained by the first measurement processing, the stationary reflection points each being a point of reflection having a relative velocity of zero;

perform area setting processing that sets, for each of the stationary reflection points extracted by the first extraction processing, an object area estimated to contain an object including a stationary reflection point;

perform removing processing that removes a direct current component from a beat signal obtained by transmitting and receiving multi-frequency continuous waves, the direct current component being a signal component which causes signal components that are based on reflected waves from nearby reflection points to be buried in a signal component that is based on reflected waves from the stationary reflection point;

perform second measurement processing that calculates, from the beat signal from which the direct current component has been removed by the removing processing, positions and relative velocities of points of reflection of the multi-frequency continuous waves;

perform second extraction processing that extracts in-area reflection points from a second result of measurement obtained by the second measurement processing, the in-area reflection points each being a point of reflection included in the object area set by the area setting processing;

perform computation processing that computes, for each of the in-area reflection points extracted by the second extraction processing, a cross velocity that is a velocity of an in-area reflection point in a cross-range direction; and perform estimation processing that statistically processes cross velocities computed by the computation processing for each of the object areas to calculate an estimated value of a cross velocity of an object located in the object area.

* * * * *